(12) United States Patent
Newman et al.

(10) Patent No.: US 10,990,990 B2
(45) Date of Patent: Apr. 27, 2021

(54) MARKET ANALYSIS SYSTEM (71) Applicant: ADP, LLC, Roseland, NJ (US)

(72) Inventors: Kurt Newman, Columbus, GA (US);
Debashis Ghosh, Charlotte, NC (US);
Robert Wohlers, Castro Valley, CA (US)

(73) Assignee: ADP, LLC, Roseland, NJ (US)

( * ) Notice: Subject to any disclaimer, the term of this patent is extended or adjusted under 35 U.S.C. 154(b) by 233 days.

(21) Appl. No.: 15/960,897

(22) Filed: Apr. 24, 2018

(65) Prior Publication Data

US 2019/0325465 A1 Oct. 24, 2019

(51) Int. Cl.
*G06Q 10/00* (2012.01)
*G06Q 30/02* (2012.01)

(52) U.S. Cl.
CPC ..... *G06Q 30/0205* (2013.01); *G06Q 30/0202* (2013.01)

(58) Field of Classification Search
None
See application file for complete search history.

(56) References Cited

U.S. PATENT DOCUMENTS

| 7,085,730 B1* | 8/2006 | Tsao | G06Q 10/06312 |
| | | | 705/7.22 |
| 7,650,294 B1* | 1/2010 | Carter | G06Q 10/04 |
| | | | 705/7.25 |
| 8,417,561 B2* | 4/2013 | Ghosh | G06Q 30/0205 |
| | | | 705/7.34 |
| 2008/0319829 A1* | 12/2008 | Hunt | G06Q 30/0201 |
| | | | 705/7.29 |
| 2009/0006156 A1* | 1/2009 | Hunt | G06Q 30/02 |
| | | | 705/7.11 |
| 2009/0018996 A1* | 1/2009 | Hunt | G06F 16/2264 |

(Continued)

OTHER PUBLICATIONS

Kumar, Dinesh, Data Analytics for Omni Channel Marketing Experience, Feb. 2015, ResearchGate, https://www.researchgate.net/publication/282071053_Data_Analytics_for_Omni_Channel_Marketing_Experience, p. 1-40.*

*Primary Examiner* — Joseph M Waesco
(74) *Attorney, Agent, or Firm* — Yee & Associates, P.C.

(57) ABSTRACT

A method, a computer system, and a computer program product for predicting changes in market dynamics for a geographic region. A computer system identifies human resource data regarding employees of organizations. The human resource data comprises geolocation data based at least partially on a geolocation of the organization and geolocations of the employees. The computer system generates a plurality of location aggregates for different combinations of dimensions of the human resource data across a plurality of different geolocations. The computer system identifies a set of matched markets for a particular geographic region based on similarities among facts for the different combinations of dimensions among the plurality of location aggregates. The computer system identifies a predicted change in market dynamics for the particular geographic region based on a change in market dynamics for the set of matched markets. The computer system digitally presents the predicted change in market dynamics for the particular geographic region.

20 Claims, 5 Drawing Sheets

(56) References Cited

U.S. PATENT DOCUMENTS

| | | | |
|---|---|---|---|
| 2010/0049538 A1* | 2/2010 | Frazer | G06Q 30/02 705/14.4 |
| 2010/0169170 A1* | 7/2010 | Fordyce, III | G06Q 30/00 705/14.17 |
| 2011/0137730 A1* | 6/2011 | McCarney | G06Q 30/0203 705/14.58 |
| 2012/0278205 A1* | 11/2012 | Chin | G06Q 10/087 705/28 |
| 2012/0284036 A1* | 11/2012 | Evans | G06Q 30/0241 705/1.1 |
| 2013/0124263 A1* | 5/2013 | Amaro | G06Q 30/02 705/7.34 |
| 2013/0346146 A1* | 12/2013 | Jaster | G06Q 30/02 705/7.29 |
| 2014/0019287 A1* | 1/2014 | Carlson | G06Q 30/0275 705/26.3 |
| 2014/0032553 A1* | 1/2014 | Chu | G06F 16/283 707/737 |
| 2014/0114707 A1* | 4/2014 | Rope | G06Q 10/10 705/7.11 |
| 2014/0236678 A1* | 8/2014 | Akerman | G06F 16/9537 705/7.34 |
| 2015/0081349 A1* | 3/2015 | Johndrow | G06Q 20/3224 705/5 |
| 2015/0206074 A1* | 7/2015 | Miller | G06F 16/212 707/792 |
| 2015/0269617 A1* | 9/2015 | Mikurak | G06Q 50/12 705/14.54 |
| 2015/0347599 A1* | 12/2015 | McMains | G06F 16/24522 707/723 |
| 2015/0347705 A1* | 12/2015 | Simon | G16H 10/60 705/3 |
| 2016/0371692 A1* | 12/2016 | Clyne | G06Q 30/0255 |
| 2017/0004430 A1* | 1/2017 | Auradkar | G06Q 10/06375 |
| 2017/0004518 A1* | 1/2017 | Moreau, Jr. | G06Q 30/0204 |
| 2017/0006135 A1* | 1/2017 | Siebel | H04L 69/40 |
| 2017/0116566 A1* | 4/2017 | Walton | G06Q 10/04 |
| 2018/0075385 A1* | 3/2018 | Condon | G06Q 10/0637 |
| 2018/0308105 A1* | 10/2018 | Fordyce, III | G06Q 30/02 |
| 2018/0336502 A1* | 11/2018 | Gonguet | G06N 7/005 |
| 2018/0342007 A1* | 11/2018 | Brannigan | G06Q 30/0635 |
| 2018/0367466 A1* | 12/2018 | Shear | H04L 47/70 |
| 2018/0374011 A1* | 12/2018 | Barr | G06F 16/254 |
| 2019/0066133 A1* | 2/2019 | Cotton | G06N 5/04 |

* cited by examiner

MARKET ANALYSIS SYSTEM

BACKGROUND INFORMATION

1. Field

The present disclosure relates generally to an improved computer system and, in particular, to a method and apparatus for accessing information in a computer system. Still more particularly, the present disclosure relates to a method, a system, and a computer program product for predicting and digitally presenting changes in market dynamics for a geographic region.

2. Background

Understanding the various factors that contribute to a successful business operation can provide great value to organizations. However, creating and executing accurate statistical models that can correlate particular operations of organizations to changes in business metrics is often difficult at best. Attributing changes in business metrics to particular operations of organizations fails to account for other factors that may have contributed to the changes.

In many cases, these other factors may affect business metrics more than business operation by the organization. For example, changes in the national or local economy, the time of year, changes in local weather conditions, changes in prices of complementary or competing products, or increases or decreases in the marketing campaigns of competitors, all of which have little relation to a business operation, may affect business metrics as much or more than that operation. A business operation may be effective when related metrics decrease. Similarly, an ineffective operation may coincide with an increase in related metrics caused by other factors.

Therefore, it would be desirable to have a method and apparatus that take into account at least some of the issues discussed above, as well as other possible issues. For example, it would be desirable to have a method and apparatus that overcome the technical problem of predicting the outcome of business operations while accounting for changing economic conditions within one or more different geographic regions.

SUMMARY

An embodiment of the present disclosure provides a method for the predicting changes in market dynamics for a geographic region. A computer system identifies human resource data regarding employees of organizations. The human resource data comprises geolocation data. The geolocation data is based at least partially on a geolocation of the organization and geolocations of the employees. The computer system generates a plurality of location aggregates for different combinations of dimensions of human resource data across a plurality of different geolocations. The computer system identifies a set of matched markets for a particular geographic region. The set of matched markets is identified based on similarities among facts for the different combinations of dimensions among the plurality of location aggregates. The computer system identifies a predicted change in market dynamics for the particular geographic region. The predicted change is identified based on a change in market dynamics for the set of matched markets. The computer system digitally presents the predicted change in market dynamics for the particular geographic region.

Another embodiment of the present disclosure provides a computer system comprising a display system, a hardware processor, and an market analysis system in communication with the display system and the hardware processor. A market analyzer of the market analysis system is configured to identify human resource data regarding employees of organizations. The human resource data comprises geolocation data. The geolocation data is based at least partially on a geolocation of the organization and geolocations of the employees. The market analyzer is configured to generate a plurality of location aggregates for different combinations of dimensions of human resource data across a plurality of different geolocations. The market analyzer is configured to identify a set of matched markets for a particular geographic region. The set of matched markets is identified based on similarities among facts for the different combinations of dimensions among the plurality of location aggregates. The market analyzer is configured to identify a predicted change in market dynamics for the particular geographic region. The predicted change is identified based on a change in market dynamics for the set of matched markets. The market analyzer is configured to digitally present the predicted change in market dynamics for the particular geographic region.

Yet another embodiment of the present disclosure provides a computer program product for predicting changes in market dynamics for a geographic region. The computer program product comprises a non-transitory computer readable storage media and program code, stored on the computer readable storage media. The program code includes program code for identifying human resource data regarding employees of organizations. The human resource data comprises geolocation data. The geolocation data is based at least partially on a geolocation of the organization and geolocations of the employees. The program code includes program code for generating a plurality of location aggregates for different combinations of dimensions of human resource data across a plurality of different geolocations. The program code includes program code for identifying a set of matched markets for a particular geographic region. The set of matched markets is identified based on similarities among facts for the different combinations of dimensions among the plurality of location aggregates. The program code includes program code for identifying a predicted change in market dynamics for the particular geographic region. The predicted change is identified based on a change in market dynamics for the set of matched markets. The program code includes program code for digitally presenting the predicted change in market dynamics for the particular geographic region.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that information about economic conditions within a particular geographic region may be beneficial to a business merchant when making business decisions. Furthermore, identifying timely information regarding changing economic conditions within a particular region may be more cumbersome and time-consuming than desirable.

The illustrative embodiments also recognize and take into account that digitally presenting a predicted change in market dynamics for the particular geographic region may allow business merchants to proactively perform operations that promote desired changes to business metrics based on changes to market dynamics in matched markets.

Thus, the illustrative embodiments provide a method and apparatus for predicting changes in market dynamics for a geographic region. In one illustrative example, a computer system identifies human resource data regarding employees of organizations. The human resource data comprises geolocation data based at least partially on a geolocation of the organization and geolocations of the employees. The computer system generates a plurality of location aggregates for different combinations of dimensions of human resource data across a plurality of different geolocations. The computer system identifies a set of matched markets for a particular geographic region based on similarities among facts for the different combinations of dimensions among the plurality of location aggregates. The computer system identifies a predicted change in market dynamics for the particular geographic region based on a change in market dynamics for the set of matched markets. The computer system digitally presents the predicted change in market dynamics for the particular geographic region.

Figure 1:
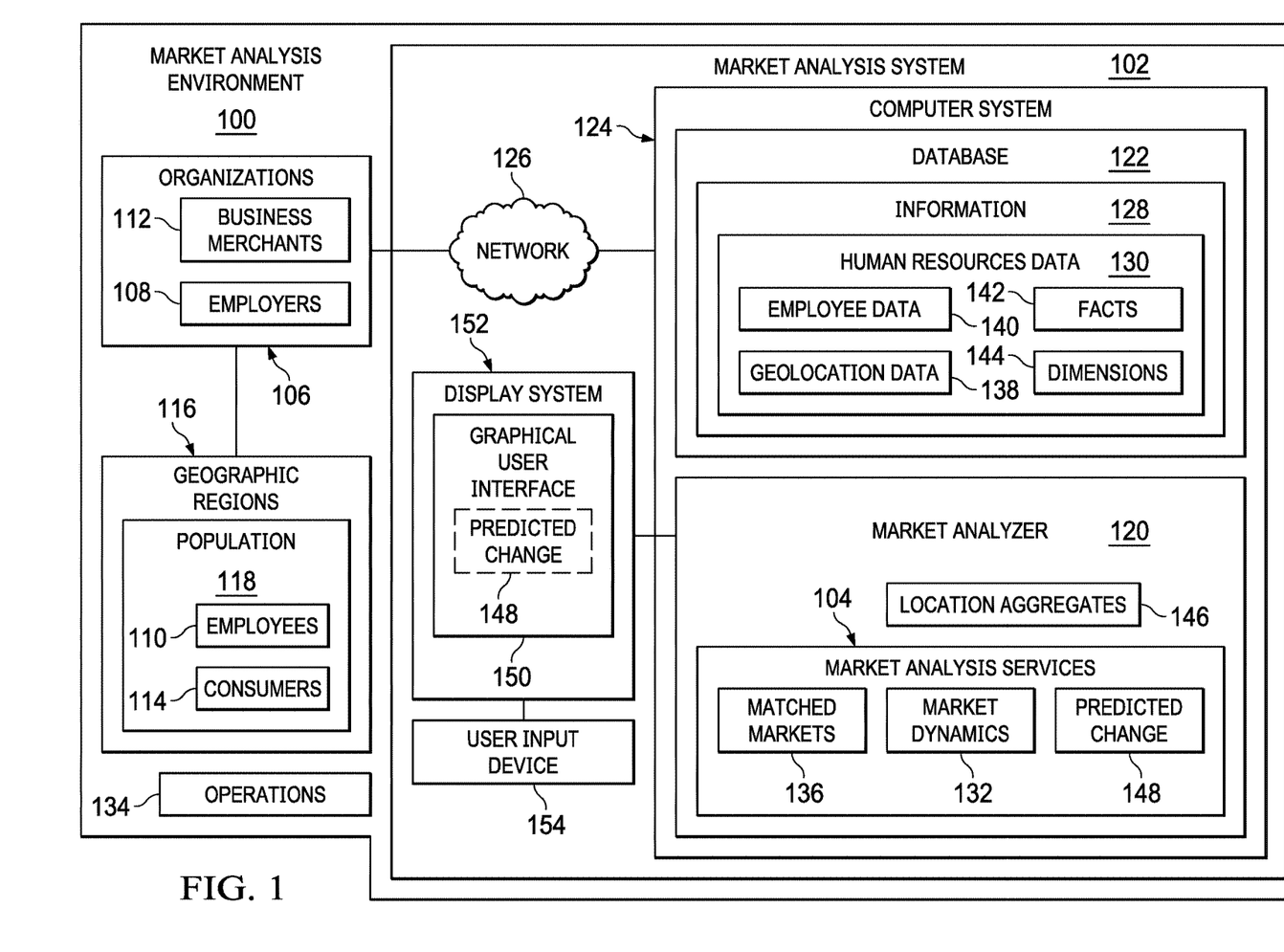
FIG. 1 is a block diagram of a market analysis system in accordance with an illustrative embodiment.

With reference next to the figures and, in particular, with reference to FIG. 1, a block diagram of a market analysis system is depicted in accordance with an illustrative embodiment. In this illustrative example, market analysis environment 100 includes market analysis system 102. Market analysis system 102 provides market analysis services 104 to one or more of organizations 106.

Organizations 106 may be, for example, a corporation, a partnership, a charitable organization, a business entity, a city, a government agency, or some other suitable type of organization. Organization 106 may operate in a number of different roles. As used herein, "a number of" means one or more different components. For example, organizations 106 may operate employers 108, providing employment to employees 110. Additionally, organizations 106 may operate as business merchants 112, providing at least one of goods and services to consumers 114. As used herein, consumers 114 can be at least one of persons residing within geographic regions 116, and organizations 106 having a place of business within geographic regions 116. Consumers 114 and employees 110 establish population 118 for each of geographic regions 116.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

As used herein, the term "business merchant" refers to any individual or any business or non-business entity that sells, distributes, trades or otherwise deals, either as a retailer or wholesaler, in goods and/or services. Business merchants can be individuals or business or non-business entities that actually produce/provide the goods and/or services being sold. Business merchants can be individuals or business or non-business entities that distribute the goods and/or services but do not produce/provide the goods and/or services.

As used herein, the term "consumer" refers to any individual or any business or non-business entity that buys or otherwise acquires goods and/or services from a business-merchant.

In this illustrative example, market analysis system 102 includes a number of different components. As depicted, market analysis system 102 includes market analyzer 120 and database 122.

Market analyzer 120 and database 122 may be implemented in computer system 124. Computer system 124 is a physical hardware system and includes one or more data processing systems. When more than one data processing system is present, those data processing systems may be in communication with each other using a communications medium. The communications medium may be a network, such as network 126. The data processing systems may be selected from at least one of a computer, a server computer, a workstation, a tablet computer, a laptop computer, a mobile phone, or some other suitable data processing system.

In this illustrative example, market analyzer 120 provides market analysis services 104 to organizations 106 based on information 128 in database 122. Information 128 can include information about organizations 106. Information 128 about organizations 106 may include, for example, at least one of information about people, products, research, product analysis, business plans, financials, or other information relating to organizations 106. As depicted, information 128 includes human resources data 130.

Market analyzer 120 may be implemented in software, hardware, firmware, or a combination thereof. When software is used, the operations performed by market analyzer 120 may be implemented in program code configured to run on hardware, such as a processor unit. When firmware is used, the operations performed by market analyzer 120 may be implemented in program code and data and stored in persistent memory to run on a processor unit. When hardware is employed, the hardware may include circuits that operate to perform the operations in market analyzer 120.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Database 122 is a network storage device capable of storing any type of data in a structured format or an unstructured format. In addition, database 122 may represent a plurality of network storage devices. Further, database 122 may store identifiers for a plurality of client device users, profiles for the plurality of client device users, file access trends by the plurality of client device users, activities performed by the plurality of client device users after accessing files, and the like. Furthermore, database 122 may store other types of data, such as authentication or credential data that may include usernames, passwords, and biometric data associated with the plurality of client device users and system administrators, for example.

As used herein, human resources data 130 is information used to perform human resources operations for employees 110 of organizations 106. For example, human resources data 130 may include data that is used to process payroll to generate paychecks for employees 110 of organizations 106. Additionally, human resources data 130 may include data that is used by human resources departments of organizations 106 to maintain benefits and other records about employees 110.

In this illustrative example, market analyzer 120 provides a method for predicting changes in market dynamics 132 for one or more different ones of geographic regions 116. Market analyzer 120 provides market analysis services 104 to organizations 106 based at least in part on market dynamics 132 determined from human resources data 130. By providing market analysis services 104 based on human resources data 130, market analyzer 120 provides market analysis services 104 in a manner that more accurately reflects changes in market dynamics 132 within given geographic regions 116. For example, providing market analysis services 104 based on market dynamics 132 identified from human resources data 130 allows organizations 106 to perform operations 134 in a manner that more accurately reflects the economic realities in one or more different geographic regions 116 as determined from one or more matched markets 136.

Market analyzer 120 identifies human resource data 130 regarding employees 110 of organizations 106. Human resource data 130 comprises geolocation data 138. Geolocation data 138 is data indicating one or more of geographic regions 116 in which population 118 is located. Geographic regions 116 can be, for example, but not limited to, a country, a time zone, a state, a region, a metropolitan area, a city, a zip code, a subdivision, a neighborhood, or a street.

In an illustrative example, geolocation data 138 is based at least partially on a geolocation of organizations 106. As used herein, the term "geolocation" refers to the real-world geographic location of an object. A geolocation can include at least one of a set of geographic coordinates, or a meaningful location, such as a street address. Geolocations of organizations 106 can be, for example but not limited to, a corporate address, a place of business, a registered address, a corporate headquarters, a satellite office, and a retail location, as well as other suitable locations for organizations 106.

In one illustrative example, geolocation data 138 can be identified from employee data 140. Employee data 140 is human resources data 130 about employees 110. Employee data 140 may include personal financial information for employees 110. For example, employee data 140 may include at least one of payroll information, tax information, salary information, a social security number, or other types of personal financial information of employees 110. Employee data 140 can include personally identifying information about employees 110. For example, employee data 140 may include at least one of a social security number, a date of birth, a name, an address, a telephone number, a driver's license number, and a professional license number, as well as possibly other information that can be used to identify geolocation data 138 of employees 110.

In this illustrative example, human resources data 130 is organized into facts 142 and dimensions 144. As used herein, "facts" are human resources data 130 that correspond to a particular one of operations 134. Facts 142 contain measurement data representing an event associated with one of operations 134. "Dimensions" are groups of hierarchies and descriptors that define facts 142.

For example, business functions can include one or more of an accounting and finance business function, an administration business function, a communications business function, a consulting business function, a human resources business function, an information technology business function, a legal business function, a logistics and distribution business function, a marketing and sales business function, an operations business function, a product development business function, a services business function, and an ancillary business function that provides support to one or more other business functions.

Market analyzer 120 generates a plurality of location aggregates 146 for different combinations of dimensions 144 of human resource data 130 across a plurality of different ones of geographic regions 116. Each one of location aggregates 146 is a summary of different combinations of dimensions 144 of human resource data 130, tracked across a particular one of geographic regions 116.

Market analyzer 120 identifies a set of matched markets 136 for a particular one of geographic regions 116. Matched markets 136 are two or more of geographic regions 116 having statistically similar ones of location aggregates 146. Market analyzer 120 identifies a set of matched markets 136 based on similarities among facts 142 for the different combinations of dimensions 144 among the plurality of location aggregates 146.

Market analyzer 120 identifies predicted change 148 in market dynamics 132 for the particular one of geographic regions 116. Market analyzer 120 identifies predicted change 148 based on a change in market dynamics 132 for the set of matched markets 136.

Market analyzer 120 digitally presents predicted change 148 in market dynamics 132 for the particular one of geographic regions 116. In this illustrative example, predicted change 148 can be displayed in graphical user interface 150 on display system 152 in market analysis system 102, and relied upon when performing operations 134.

As depicted, display system 152 is a physical hardware system and includes one or more display devices. The display devices may include at least one of a light emitting diode (LED) display, a liquid crystal display (LCD), an organic light emitting diode (OLED) display, or some other suitable display device.

An operator may interact with graphical user interface 150 through user input generated by user input device 154. User input device 154 may be, for example, a mouse, a keyboard, a trackball, a touchscreen, a stylus, or some other suitable type of input device.

The illustrative example in FIG. 1 and the examples in the other subsequent figures provide one or more technical solutions to overcome a technical problem of predicting the outcome of business operations based on the economic realities in one or more different geographic regions 116 as determined from one or more matched markets 136. For example, market analyzer 120 identifies human resources data 130 regarding employees 110 of organizations 106. Human resources data 130 comprises geolocation data 138 based at least partially on a geolocation of organization 106 and geolocations of employees 110. Market analyzer 120 generates a plurality of location aggregates 146 for different combinations of dimensions 144 of human resource data 130 across a plurality of different geolocations. Market analyzer 120 identifies a set of matched markets 136 for a particular one of geographic regions 116 based on similarities among facts 142 for the different combinations of dimensions 144 among the plurality of location aggregates 146. Market analyzer 120 identifies predicted change 148 in market dynamics 132 for the particular one of geographic regions 116 based on a change in market dynamics 132 for the set of matched markets 136. Market analyzer 120 digitally presents predicted change 148 in market dynamics 132 for the particular one of geographic regions 116.

In this manner, the use of market analyzer 120 allows organizations 106 to predict changes in market dynamics 132 for one or more different ones of geographic regions 116. Market analyzer 120 provides market analysis services 104 to organizations 106 based at least in part on market dynamics 132 determined from human resources data 130. By providing market analysis services 104 based on human resources data 130, market analyzer 120 provides market analysis services 104 in a manner that more accurately reflects changes in market dynamics 132 within given geographic regions 116. For example, providing market analysis services 104 based on market dynamics 132 identified from human resources data 130 allows organizations 106 to perform operations 134 in a manner that more accurately reflects the economic realities in one or more different geographic regions 116 as determined from one or more matched markets 136.

As a result, computer system 124 operates as a special purpose computer system in which market analyzer 120 in computer system 124 enables determining predicted change 148 in market dynamics 132 due to operations 134 by organizations 106 in particular ones of geographic regions 116 based on matched markets 136 identified from human resources data 130. By determining matched markets 136, market analyzer 120 enables more efficient performance of operations 134 for organizations 106. For example, organizations 106 can perform operations 134, such as, but not limited to, at least one of hiring, benefits administration, payroll, performance reviews, forming teams for new products, assigning research projects, or other suitable operations, to promote predicted change 148 in market dynamics 132. In this manner, market analyzer 120 allows organizations 106 to perform operations 134 based on predicted change 148 in market dynamics 132 for one or more different ones of geographic regions 116.

Thus, market analyzer 120 transforms computer system 124 into a special purpose computer system as compared to currently available general computer systems that do not have market analyzer 120. Currently used general computer systems do not enable determining predicted change 148 in market dynamics 132 due to operations 134 by organizations 106 in particular ones of geographic regions 116 based on matched markets 136 identified from human resources data 130.

Figure 2:
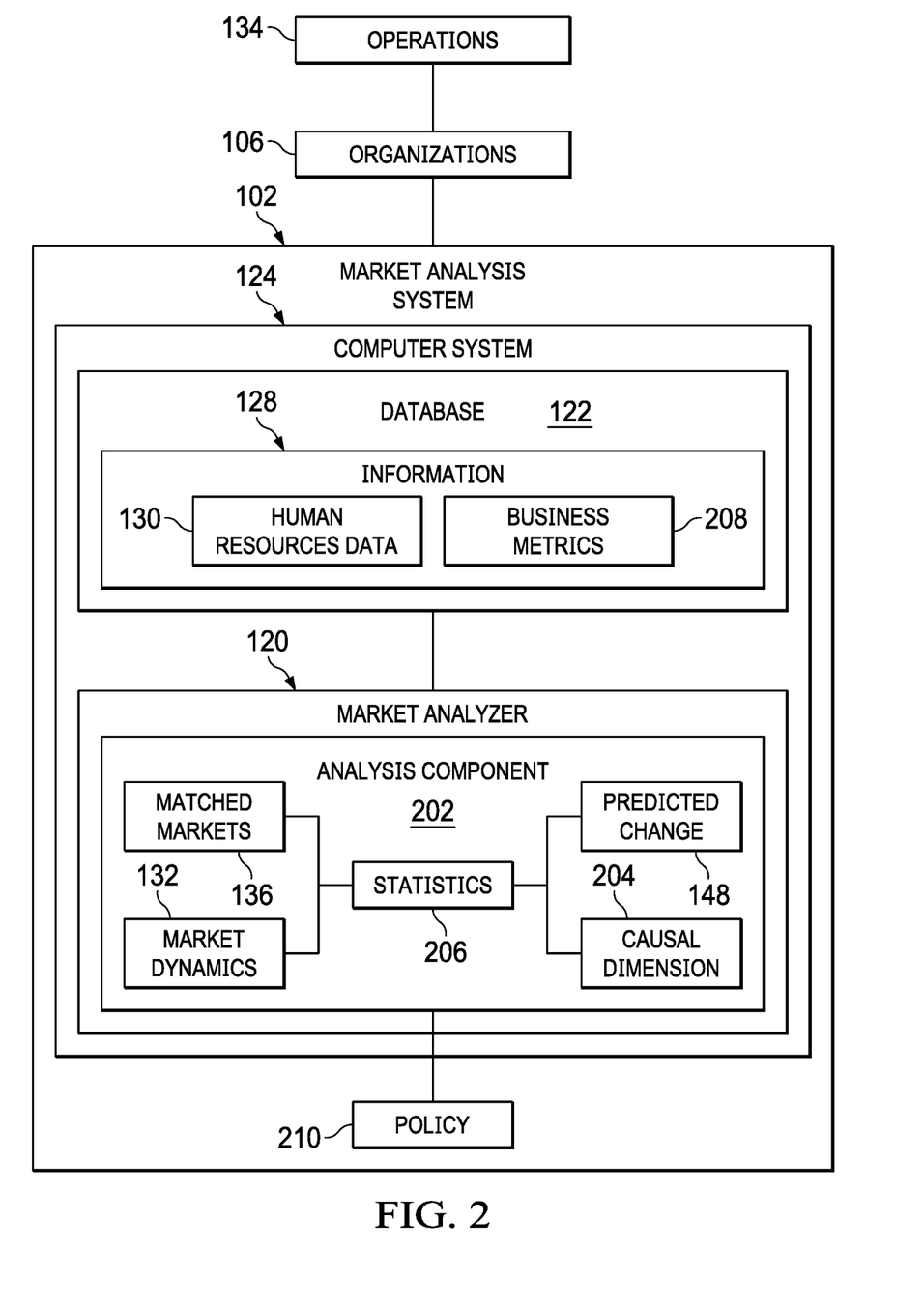
FIG. 2 is a block diagram of a data flow for identifying a predicted change in market dynamics in accordance with an illustrative embodiment.

With reference next to FIG. 2, a data flow for identifying a predicted change in market dynamics is depicted in accordance with an illustrative embodiment. As depicted, market analyzer 120 includes analysis component 202. Market analyzer 120 uses analysis component 202 to identify predicted change 148 in market dynamics 132.

In this illustrative example, in identifying predicted change 148 in market dynamics 132, market analyzer 120 identifies causal dimension 204 among the different combinations of dimensions 144 of FIG. 1. Causal dimension 204 is one of dimensions 144 that is the proximate cause for the change in market dynamics 132 for the set of matched markets 136.

In one illustrative example, analysis component 202 generates a set of distributions for a set of facts 142, shown in FIG. 1, across matched markets 136. Statistics 206 is then generated for each one of matched markets 136 in relation to location aggregates 146 of FIG. 1. In this illustrative example, the set of statistics 206 comprises at least one of an absolute difference, a percentage difference, a Z-score, a p-value, and a percentile rank, as well as other appropriate statistics and combinations thereof.

In this illustrative example, statistics 206 can include a correlation score that provides a measure of a statistical correlation between different ones of facts 142 and changes to market dynamics 132 in matched markets 136. The correlation score provides a measure of the degree to which changes to different ones of facts 142 drive corresponding changes in market dynamics 132. The correlation score may be determined by leveraging one or more of statistics 206, including a percentage difference, a Z-score, and a p-value, as well as other factors including a time-recency of the corresponding changes to market dynamics 132 in matched markets 136, and a number of dimensions 144 used in determining location aggregates 146.

In this illustrative example, in digitally presenting predicted change 148, market analyzer 120 digitally presenting predicted change 148 to market dynamics 132 in the particular one of geographic regions 116 in relation to causal dimension 204. Computer system 124 can then perform operation 134 for organizations 106 in the particular one of geographic regions 116 based on predicted change 148 in market dynamics 132.

In an illustrative example, information 128 includes business metrics 208. Business metrics 208 are quantifiable measures that track and assess the status of specific ones of operations 134 for organizations 106. In this illustrative example, market analyzer 120 selects a particular one of operations 134 based on causal dimension 204 identified among the combinations of dimensions to promote a desired change to business metrics 208 of organizations 106.

In this illustrative example, market analyzer 120 selects one of operations 134 using policy 210. In this illustrative example, policy 210 includes a group of rules that are used to select among operations 134 based on changes to market dynamics 132 in matched markets 136. Policy 210 also may include data used to apply the group of rules.

For example, one rule in policy 210 may specify one or more operations 134 that promote a change to business metrics 208 of organizations 106 when a positive change in market dynamics 132 is identified in matched markets 136. Based on the identified change in market dynamics 132, market analyzer 120 may apply this rule to promote a desired change to business metrics 208.

Another rule in policy 210 may specify one or more operations 134 that promote a change to business metrics 208 of organizations 106 when a negative change in market dynamics 132 is identified in matched markets 136. Based on the identified change in market dynamics 132, market analyzer 120 may apply this rule to promote a desired change to business metrics 208.

Figure 3:
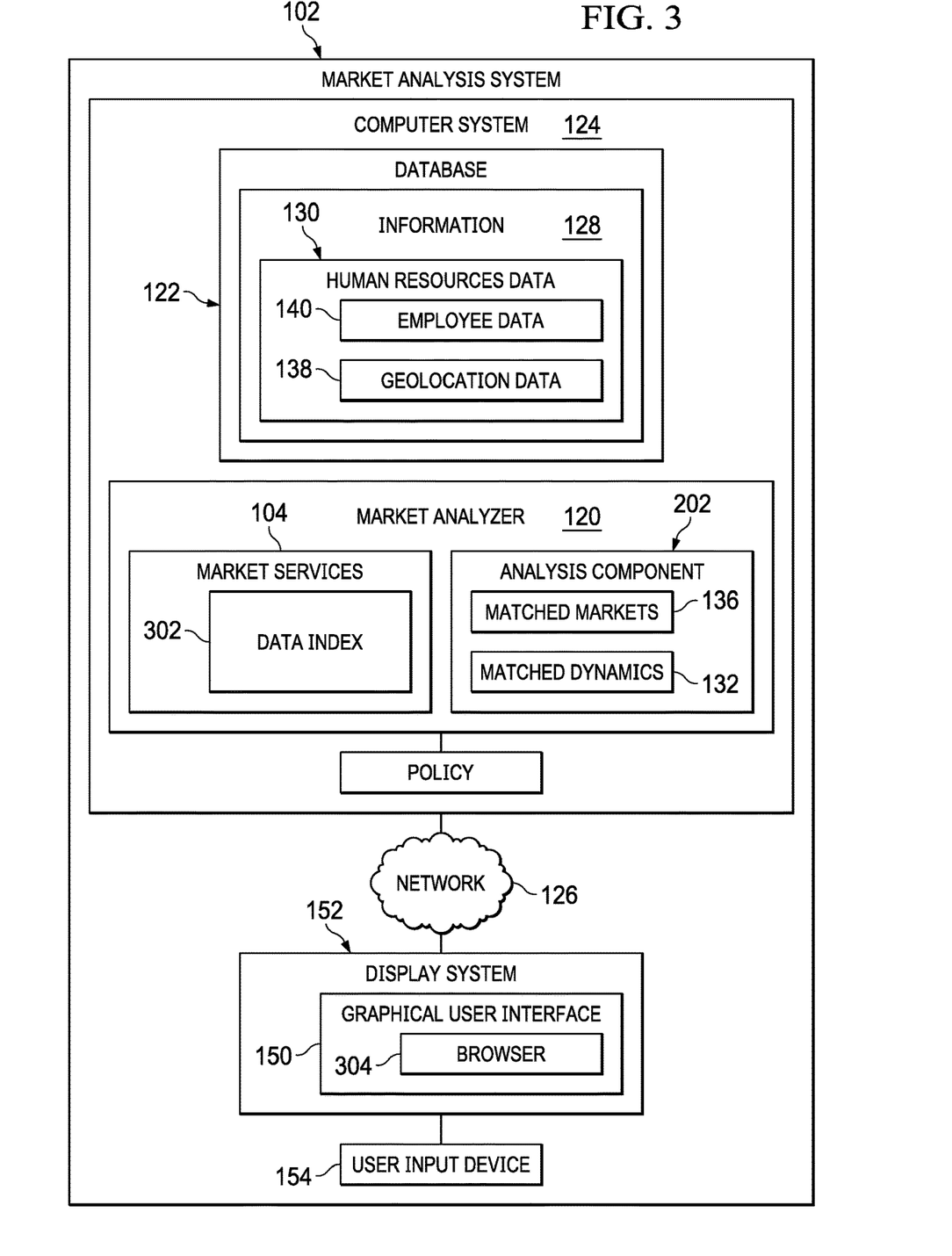
FIG. 3 is a block diagram of a data flow for providing market services to one or more organizations in accordance with an illustrative embodiment.

With reference next to FIG. 3, a data flow for providing market services to one or more organizations is depicted in accordance with an illustrative embodiment. In one illustrative example, market analysis services 104 can further include data index 302. Data index 302 is an indexing tool provided for indexing human resources data 130 by geolocation data 138. This indexing makes human resources data 130 searchable according to geographic regions 116 of FIG. 1. The indexing of human resources data 130 forms indexed human resource data.

In this illustrative example, data index 302 indexes human resources data 130 to geolocation data 138 to provide human resources data 130 that is searchable by geolocation data 138. Market analyzer 120 can then provide a search tool, such as in browser 304, associated with the indexed human resources data 130, thereby enabling a user accessing market analysis services 104 to search the indexed human resources data 130 by according to geolocation data 138.

For example, market analyzer 120 receives an instruction that defines one of geographic regions 116. The instruction can be received from one of organizations 106, accessing market analysis services 104 through browser 304.

In response to receiving the instruction, market analyzer 120 then determines the change in market dynamics 132. Market analyzer 120 searches the indexed human resources data 130 to identify human resources data 130 for employees 110 of organizations 106, both shown in FIG. 1. In this illustrative example, at least one of the geographic location of organizations 106 and geographic locations of employees 110 is within a particular one of geographic regions 116, as defined in the instruction and indicated by geolocation data 138.

Market analyzer 120 identifies the change in market dynamics 132 for the particular one of geographic regions 116 based on an aggregate change in human resources data 130 for employees 110 of organizations 106 in matched markets 136.

Figure 4:
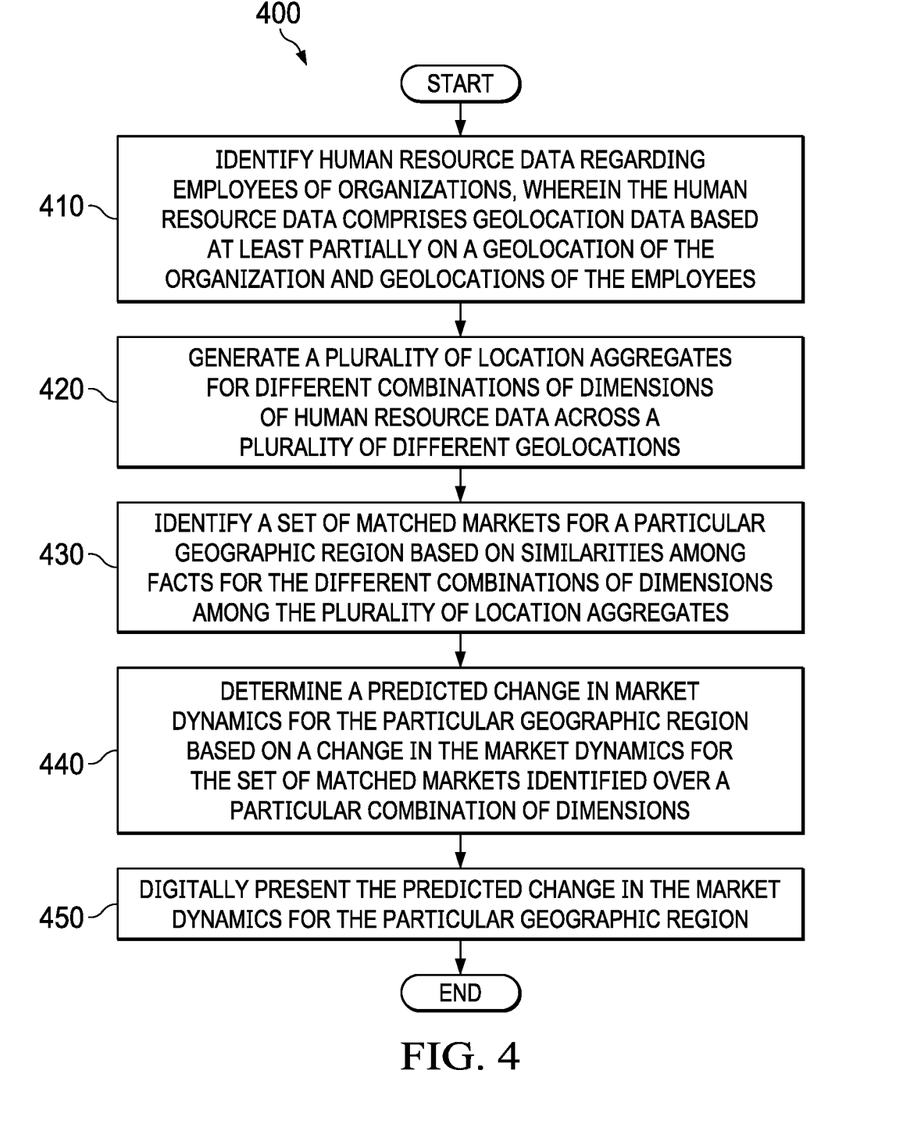
FIG. 4 is a flowchart of a method for predicting changes in market dynamics in accordance with an illustrative embodiment.

With reference next to FIG. 4, an illustration of a flowchart of a method for predicting changes in market dynamics is depicted in accordance with an illustrative embodiment. The process in FIG. 4 may be implemented in market analysis system 102 shown in block form in FIGS. 1-3.

Process 400 begins by identifying human resource data regarding employees of organizations, wherein the human resource data comprises geolocation data based at least partially on a geolocation of the organization and geolocations of the employees (step 410). The human resources data can be human resources data 130 regarding employees 110 of organizations 106, all shown in block form in FIG. 1.

The process generates a plurality of location aggregates for different combinations of dimensions of human resource data across a plurality of different geolocations (step 420). The location aggregates can be location aggregates 146 for combinations of dimensions 144, both shown in block form in FIG. 1.

The process identifies a set of matched markets for a particular geographic region based on similarities among facts for the different combinations of dimensions among the plurality of location aggregates (step 430). The matched markets can be matched markets 136 for one of geographic regions 116, both shown in block form in FIG. 1.

The process identifies a predicted change in market dynamics for the particular geographic region based on a change in the market dynamics for the set of matched markets (step 440). The predicted change can be predicted change 148 shown in block form in FIG. 1.

The process then digitally presents the predicted change in the market dynamics for the particular geographic region (step 450), with the process terminating thereafter. In this manner, process 400 enables organizations to proactively perform operations that promote desired changes to business metrics based on changes to market dynamics in matched markets.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 5:
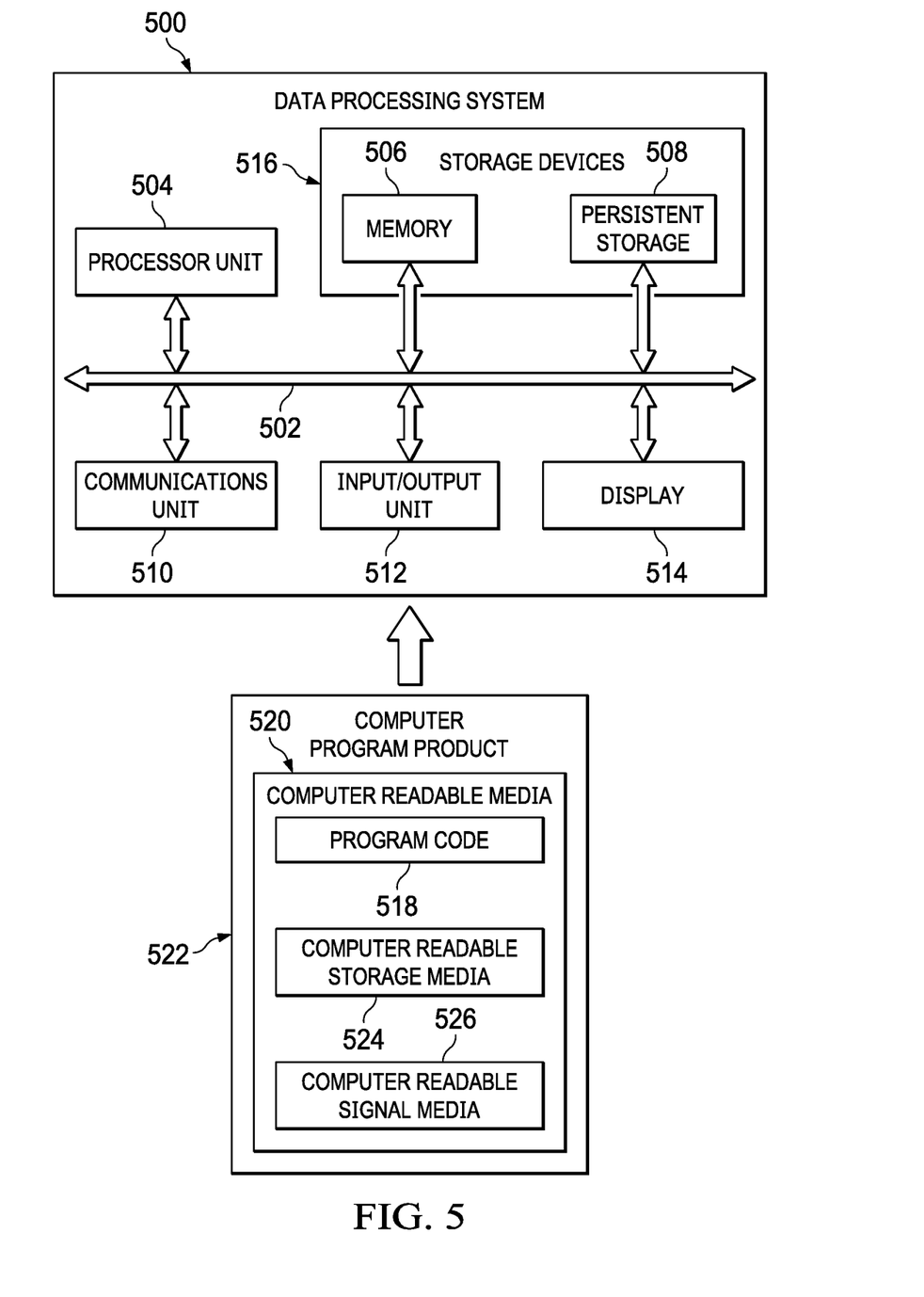
FIG. 5 is a block diagram of a data processing system in accordance with an illustrative embodiment.

Turning now to FIG. 5, an illustration of a block diagram of a data processing system is depicted in accordance with an illustrative embodiment. Data processing system 500 may be used to implement one or more of market analysis system 102, and computer system 124, shown in block form in FIG. 1. In this illustrative example, data processing system 500 includes communications framework 502, which provides communications between processor unit 504, memory 506, persistent storage 508, communications unit 510, input/output (I/O) unit 512, and display 514. In this example, communications framework 502 may take the form of a bus system.

Processor unit 504 serves to execute instructions for software that may be loaded into memory 506. Processor unit 504 may be a number of processors, a multi-processor core, or some other type of processor, depending on the particular implementation.

Memory 506 and persistent storage 508 are examples of storage devices 516. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 516 may also be referred to as computer readable storage devices in these illustrative examples. Memory 506, in these examples, may be, for example, a random-access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a solid state hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through at least one of a keyboard, a mouse, or some other suitable input device. Further, input/output unit 512 may send output to a printer. Display 514 provides a mechanism to display information to a user.

Instructions for at least one of the operating system, applications, or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these illustrative examples. In one example, computer readable media 520 may be computer readable storage media 524 or computer readable signal media 526. In these illustrative examples, computer readable storage media 524 is a physical or tangible storage device used to store program code 518 rather than a medium that propagates or transmits program code 518.

Alternatively, program code 518 may be transferred to data processing system 500 using computer readable signal media 526. Computer readable signal media 526 may be, for example, a propagated data signal containing program code 518. For example, computer readable signal media 526 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 500 are not meant to provide architectural limitations to the manner in which different embodiments may be implemented. The different illustrative embodiments may be implemented in a data processing system including components in addition to or in place of those illustrated for data processing system 500. Other components shown in FIG. 5 can be varied from the illustrative examples shown. The different embodiments may be implemented using any hardware device or system capable of running program code 518.

Thus, the illustrative embodiments provide a method, an apparatus, and a computer program product for predicting changes in market dynamics for a geographic region. The illustrative examples described herein provide one or more technical solutions to overcome a technical problem of predicting the outcome of business operations based on the economic realities in one or more different ones of geographic regions 116 as determined from one or more of matched markets 136. For example, market analyzer 120 identifies human resources data 130 regarding employees 110 of organizations 106. Human resources data 130 comprises geolocation data 138 based at least partially on a geolocation of organizations 106 and geolocations of employees 110. Market analyzer 120 generates a plurality of location aggregates 146 for different combinations of dimensions 144 of human resource data 130 across a plurality of different geolocations. Market analyzer 120 identifies a set of matched markets 136 for a particular one of geographic regions 116 based on similarities among facts 142 for the different combinations of dimensions 144 among the plurality of location aggregates 146. Market analyzer 120 identifies predicted change 148 in market dynamics 132 for the particular one of geographic regions 116 based on a change in market dynamics 132 for the set of matched markets 136. Market analyzer 120 digitally presents predicted change 148 in market dynamics 132 for the particular one of geographic regions 116.

In this manner, the use of market analyzer 120 allows organizations 106 to predict changes in market dynamics 132 for one or more different ones of geographic regions 116. Market analyzer 120 provides market analysis services 104 to organizations 106 based at least in part on market dynamics 132 determined from human resources data 130. By providing market analysis services 104 based on human resources data 130, market analyzer 120 provides market analysis services 104 in a manner that more accurately reflects changes in market dynamics 132 within given geographic regions 116. For example, providing market analysis services 104 based on market dynamics 132 identified from human resources data 130 allows organizations 106 to perform operations 134 in a manner that more accurately reflects the economic realities in one or more different ones of geographic regions 116 as determined from one or more of matched markets 136.

As a result, computer system 124 operates as a special purpose computer system in which market analyzer 120 in computer system 124 enables determining predicted change 148 in market dynamics 132 due to operations 134 by organizations 106 in a particular one of geographic regions 116 based on matched markets 136 identified from human resources data 130. By determining matched markets 136, market analyzer 120 enables more efficient performance of operations 134 for organization 106. For example, organization 106 can perform operations 134, such as, but not limited to, at least one of hiring, benefits administration, payroll, performance reviews, forming teams for new products, assigning research projects, or other suitable operations, to promote predicted change 148 in market dynamics 132. In this manner, market analyzer 120 allows organizations 106 to perform operations 134 based on predicted change 148 in market dynamics 132 for one or more different ones of geographic regions 116.

Thus, market analyzer 120 transforms computer system 124 into a special purpose computer system as compared to currently available general computer systems that do not have market analyzer 120. Currently used general computer systems do not enable determining predicted change 148 in market dynamics 132 due to operations 134 by organizations 106 in particular ones of geographic regions 116 based on matched markets 136 identified from human resources data 130.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting changes in market dynamics for a geographic region, the method comprising:
   identifying, by a computer system comprising a market analyzer, human resource data regarding employees of organizations, wherein the human resource data comprises geolocation data based at least partially on a geolocation of the organizations and geolocations of the employees;
   indexing, by the computer system, the human resource data by the geolocation data and providing the human resource data that is searchable by the geolocation data as indexed human resource data;
   providing, from the market analyzer, a search tool to a browser in a graphical user interface in a display system connected to the market analyzer;
   subsequently searching, using the search tool and the geolocation data, the human resource data;
   generating, by the computer system, a plurality of location aggregates for different combinations of dimensions of the human resource data across a plurality of different geolocations;
   receiving, through the search tool using the indexed human resource data, an instruction defining a particular geographic region, and searching the indexed human resource data using the geolocation data;
   searching, using an indexing tool in the market analyzer in the computer system, the indexed human resource data and identifying, using statistical similarities among facts for the different combinations of dimensions among the plurality of location aggregates, a set of matched markets for the particular geographic region, wherein at least one of the geolocation of the organizations and the geolocations of the employees is within the particular geographic region;
   identifying, by the market analyzer using the indexing tool and an aggregate change in the human resource data for the employees having geolocations within the set of matched markets, a change in market dynamics for the set of matched markets;
   predicting, by the computer system, a predicted change in market dynamics for the particular geographic region based on the change in market dynamics for the set of matched markets; and
   digitally presenting, by the computer system, in a graphical user interface on a display system, the predicted change in market dynamics for the particular geographic region.

2. The method of claim 1, further comprising:
   identifying, by the computer system, a causal dimension among the different combinations of dimensions that is a proximate cause for the change in market dynamics for the set of matched markets; and
   digitally presenting, by the computer system, the predicted change in market dynamics for the particular geographic region in relation to the causal dimension.

3. The method of claim 2 further comprising:
   performing, by the computer system, a business operation and for an organization in the particular geographic region based on the predicted change in market dynamics for the particular geographic region.

4. The method of claim 3, wherein the business operation is selected based on the causal dimension identified among the different combinations of dimensions to promote a desired change to business metrics of the organization.

5. The method of claim 1, further comprising selecting, by the market analyzer using a policy comprising a group of rules for selecting an operation based upon the predicted change for the particular geographic region.

6. The method of claim 5, wherein the operation based upon the predicted change for the particular geographic region comprises one of: hiring, benefits administration, payroll, performance reviews, forming teams for new products, or assigning research projects.

7. The method of claim 1, further comprising the market analyzer comprising an analysis component generating statistics and a correlation score for each matched market.

8. The method of claim 7, further comprising the analysis component generating the correlation score by at least one of:
   leveraging one or more of: a percentage difference, a Z-score, or a p-value; or
   a time-recency of corresponding changes to the market dynamics in the set of matched markets, or a number of dimensions used in determining the location aggregates.

9. A computer system that comprises:
   a display system;
   a hardware processor; and a market analyzer in communication with the display system and the hardware processor, such that the market analyzer is configured:
  to identify human resource data regarding employees of organizations, wherein the human resource data comprises geolocation data based at least partially on a geolocation of the organizations and geolocations of the employees;
  to index the human resource data by the geolocation data to provide the human resource data that is searchable by the geolocation data as indexed human resource data;
  to provide a search tool, associated with indexed human resource data, to a browser in a graphical user interface in the display system to subsequently search the indexed human resource data based upon the geolocation data;
  to generate a plurality of location aggregates for different combinations of dimensions of the indexed human resource data across a plurality of different geolocations;
  to receive through the search tool and based upon the indexed human resource data, an instruction that defines a particular geographic region, the instructions being received through; the search tool configured to:
    search the indexed human resource data based upon the geolocation data; and
    search, based upon an index tool in the market analyzer, the indexed human resource data to identify a set of matched markets for the particular geographic region based on statistical similarities among facts for the different combinations of dimensions among the plurality of location aggregates, wherein at least one of a geographic location of the organizations and geographic locations of the employees is within the particular geographic region;
  to identify a change in market dynamics for the set of matched markets based on the index tool and an aggregate change in the human resource data for the employees of the organizations within geographic locations within the set of matched markets;
  to predict a predicted change in market dynamics for the particular geographic region based on a change in market dynamics for the set of matched markets; and
  to digitally present the predicted change in market dynamics for the particular geographic region.

10. The computer system of claim 9, further comprising the market analyzer configured to:
  identify a causal dimension among the different combinations of dimensions that is a proximate cause for the change in market dynamics for the set of matched markets; and
  digitally present the predicted change in market dynamics for the particular geographic region in relation to the causal dimension.

11. The computer system of claim 10, wherein the computer system is further configured to perform a business operation and for an organization in the particular geographic region based on the predicted change in market dynamics for the particular geographic region.

12. The computer system of claim 11, wherein the business operation is selected based on the causal dimension identified among the different combinations of dimensions to promote a desired change to business metrics of the organization.

13. The computer system of claim 9, further comprising the market analyzer configured to select, based upon a policy that comprises a group of rules to select among operations, an operation based upon the predicted change for the particular geographic region.

14. The computer system of claim 13, wherein the operation based upon the predicted change for the particular geographic region comprises one of: hiring, benefits administration, payroll, performance reviews, forming teams for new products, or assigning research projects.

15. The computer system of claim 9, further comprising the market analyzer comprising an analysis component configured to generate statistics and a correlation score for each matched market.

16. The computer system of claim 15, further comprising the analysis component generating the correlation score by at least one of:
  leveraging one or more of: a percentage difference, a Z-score, or a p-value; or
  a time-recency of corresponding changes to the market dynamics in the set of matched markets, or a number of dimensions used in determining the location aggregates.

17. A computer program product configured to predict changes in market dynamics for a geographic region, such that the computer program product comprises:
  a non-transitory computer readable storage media that comprises program code, stored on the non-transitory computer readable storage media, configured to:
  identify human resource data regarding employees of organizations, wherein the human resource data comprises geolocation data based at least partially on a geolocation of the organizations and geolocations of the employees;
  index the human resource data by the geolocation data to provide the human resource data that is searchable by the geolocation data as indexed human resource data;
  provide a search tool to a browser in a graphical user interface in a display system to subsequently search the indexed human resource data based upon the geolocation data;
  generate a plurality of location aggregates for different combinations of dimensions of the indexed human resource data across a plurality of different geolocations;
  receive, through the search tool and based upon the indexed human resource data, an instruction that defines a particular geographic region received;
  search, based upon statistical similarities among facts for the different combinations of dimensions among the plurality of location aggregates, the indexed human resource data to identify a set of matched markets for the particular geographic region, such that at least one of the geolocation of the organizations and the geolocations of the employees is within the particular geographic region;
  identify a change in market dynamics for the set of matched markets based an index tool and on an aggregate change in the indexed human resource data for the employees of the organizations in geographic locations within the set of matched markets;
  predict a predicted change in market dynamics for the particular geographic region based on a change in market dynamics for the set of matched markets; and
  digitally present the predicted change in market dynamics for the particular geographic region.

18. The computer program product of claim 17, wherein the program code for identifying the predicted change in market dynamics for the particular geographic region further comprises the program code, stored on the non-transitory computer readable storage media, configured to:
- command a market analyzer in the computer program product to select, based upon a policy comprising a group of rules for selecting among operations, an operation based upon the predicted change for the particular geographic region;
- identify a causal dimension among the different combinations of dimensions that is a proximate cause for the change in market dynamics for the set of matched markets; and
- digitally present the predicted change in market dynamics for the particular geographic region in relation to the causal dimension.

19. The computer program product of claim 18 further comprising:
- the program code, stored on the non-transitory computer readable storage media, configured to perform a business operation and for an organization in the particular geographic region based on the predicted change in market dynamics for the particular geographic region.

20. The computer program product of claim 19, wherein the business operation is selected based on the causal dimension identified among the different combinations of dimensions to promote a desired change to business metrics of the organization.

* * * * *